O. P. NORMAN.
AUTOMATIC CUTLERY GRINDER.
APPLICATION FILED JULY 6, 1920.
1,392,698.
Patented Oct. 4, 1921.
4 SHEETS—SHEET 3.
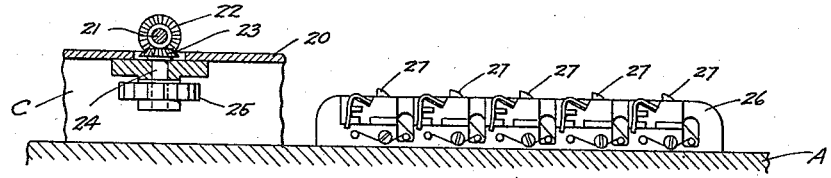
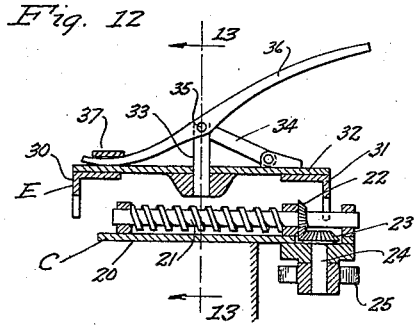
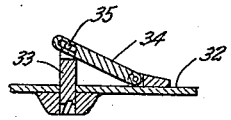
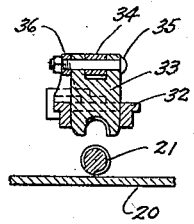
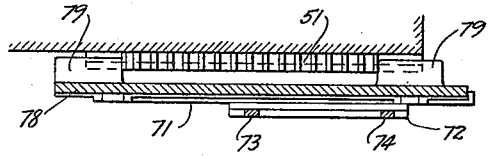
Inventor
Orville P. Norman
by Nuttall and Wallace
his Attorneys O. P. NORMAN.
AUTOMATIC CUTLERY GRINDER.
APPLICATION FILED JULY 6, 1920.
1,392,698.
Patented Oct. 4, 1921.
4 SHEETS—SHEET 4.
Fig. 18
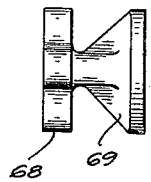
Fig. 18-a
Fig. 19
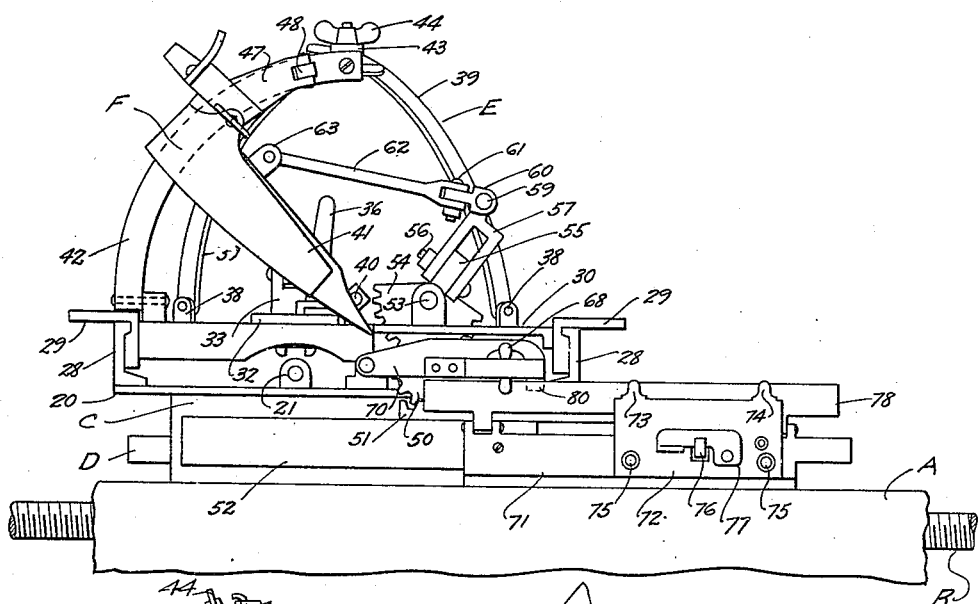
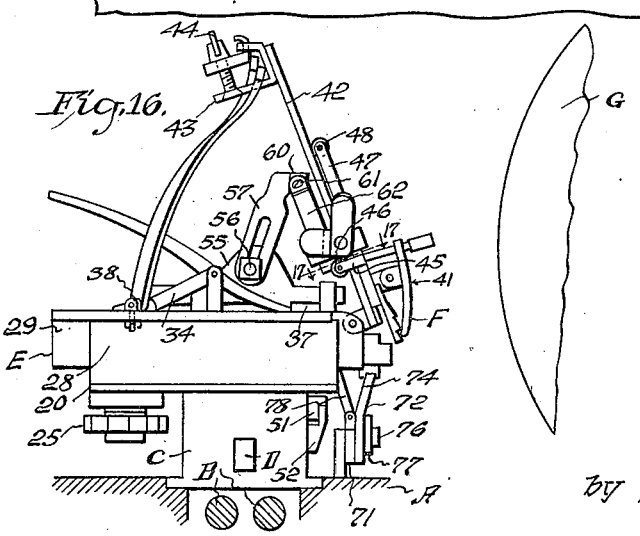
Fig. 17.
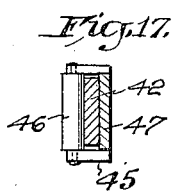
Inventor
Orville P. Norman
by Westall and Wallace
his Attorneys

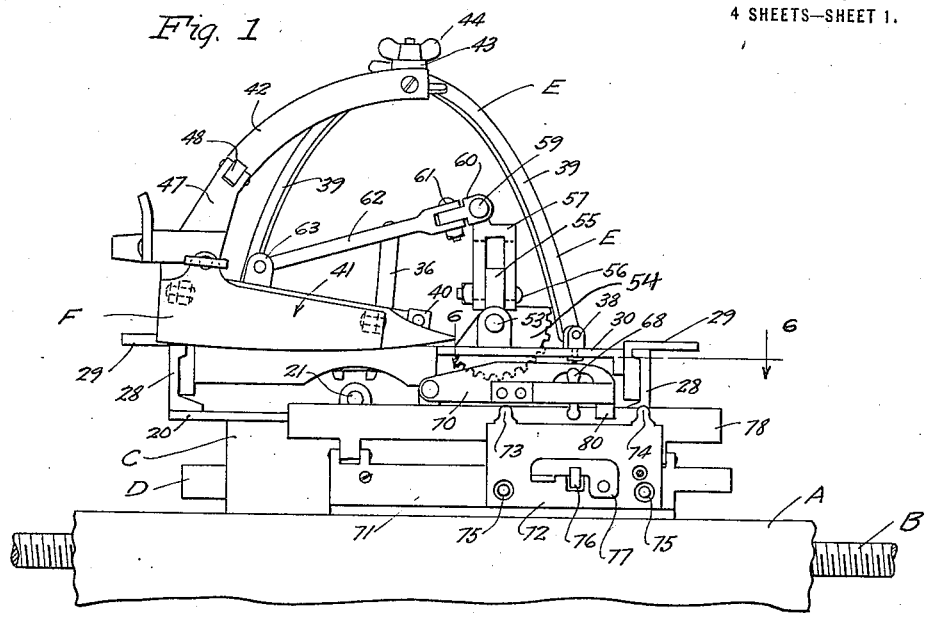

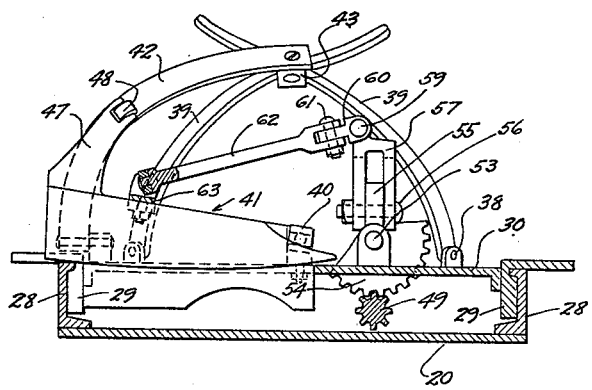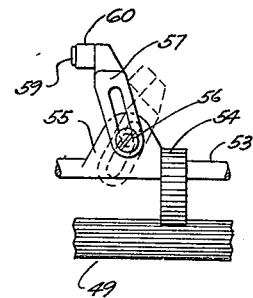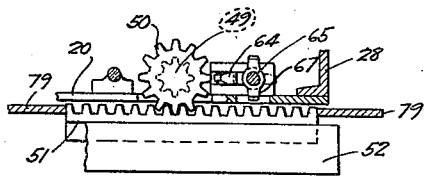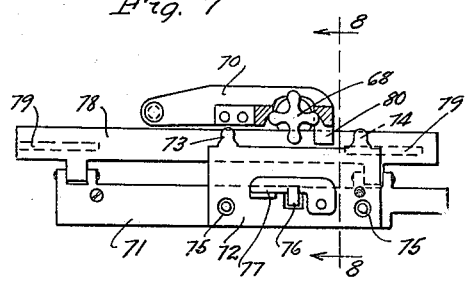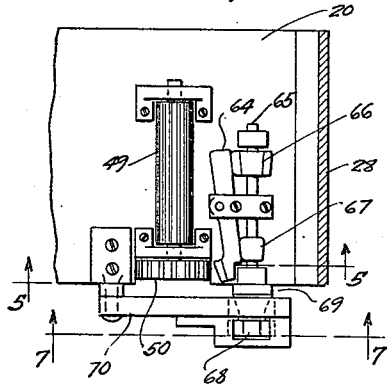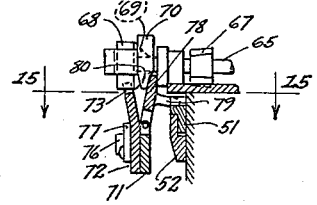

UNITED STATES PATENT OFFICE.

ORVILLE P. NORMAN, OF LOS ANGELES, CALIFORNIA, ASSIGNOR OF ONE-HALF TO LESTER ALICE WINTER, OF LOS ANGELES, CALIFORNIA.

AUTOMATIC CUTLERY-GRINDER.

1,392,698.   Specification of Letters Patent.   Patented Oct. 4, 1921.

Application filed July 6, 1920. Serial No. 394,115.

*To all whom it may concern:*

Be it known that I, ORVILLE P. NORMAN, a citizen of the United States, residing at Los Angeles, in the county of Los Angeles and State of California, have invented new and useful Improvements in an Automatic Cutlery-Grinder, of which the following is a specification.

This invention relates to a mechanism for automatically feeding cutlery having a curved edge to a grinding tool, such as a wheel.

Articles of cutlery of various classes are usually provided with cutting edges having a curved portion, and these curved portions of the edges are of various radii. Moreover, the bevel of the edges is different depending upon the class and style of the article. It is the primary object of this invention to provide a device to automatically feed the cutlery, which is first, adjustable as to curvature; and which is second, adjustable as to the bevel. In addition to the broader objects of this invention there are various details of structure, whereby an easily manipulated device having wide limits of adjustment is secured.

This invention is especially adaptable for use with the mechanical movements disclosed in my Patents, 1,210,353, granted Dec. 26, 1916, and 1,268,048, granted May 28, 1918. However, the invention is not limited to use with the mechanical movements referred to.

These objects together with other objects and corresponding accomplishments are obtained by means of the embodiment of my invention illustrated in the accompanying drawings, in which:

Figure 1 is a front elevation of the complete grinding device mounted upon a reciprocating carriage; Fig. 2 is a plan view of the construction shown in Fig. 1; Fig. 3 is a section taken on the line 3—3 of Fig. 2 above the base, and a vertical section through the base looking in the direction of the appended arrows the guide being shown adjusted to a different angle; Fig. 4 is a fragmentary detail showing the adjustable crank arm. Fig. 5 is a section as seen on the line 5—5 of Fig. 6; Fig. 6 is a fragmentary section on a horizontal line through the base as seen on the line 6—6 of Fig. 1; Fig. 7 is a section as seen on the line 7—7 of Fig. 6; Fig. 8 is a fragmentary section as seen on the line 8—8 of Fig. 7; Fig. 9 is a view similar to Fig. 8 showing the rack holding bar in another position. Fig. 10 is a view similar to Fig. 9 showing the rack holding bar in releasing position; Fig. 11 is an enlarged fragmentary section as seen on the line 11—11 of Fig. 2 looking in the direction of the appended arrows with a ratchet tooth rack disposed to engage a ratchet wheel to feed the carriage toward the grinding tool; Fig. 12 is a section through the base showing the worm locking device as seen looking in the direction of arrow 12 appended to Fig. 2; Fig. 13 is a section taken on the line 13—13 of Fig. 12; Fig. 14 is a fragmentary section of a portion of the structure shown in Fig. 12; Fig. 15 is a plan view of the rack and rack holding bar; Fig. 16 is a side elevation of the complete structure; and Fig. 17 is an enlarged section through the guide for the clamp; Figs. 18 and 18ª are plan views of the star wheel and cam hub in positions at right angles to each other; and Fig. 19 is a view similar to Fig. 1 showing the clamp in its upper position.

Referring more particularly to Figs. 1, 2, 16, A indicates a conveyer bed having conveyer screws B with which is engaged a reciprocating carriage C having a change bar D for changing the direction of movement of the carriage. Mounted upon the carriage C is a cutlery holding mechanism indicated generally by E. The carriage C is intended to travel along the bed A transversely to a grinding wheel G. The cutlery holding device E is adapted to be fed upon the carriage toward the grinding wheel. The cutlery holding mechanism has a clamp F which is adapted to be swung through the arc of a circle during the reciprocation of the carriage and at the proper time.

Fixedly secured to the carriage C is a base plate 20. Journaled on the base plate is a worm 21 extending transversely to the carriage. Fixed to the worm is a bevel pinion 22 meshing with a bevel pinion 23. The bevel pinion 23 is fixed to a shaft 24 carrying at its lower end a ratchet wheel 25. Referring particularly to Fig. 11, a rack 26 has a number of ratchet teeth 27, which are free to swing downwardly in one direction but are restrained against movement in the other direction. This ratchet rack may be of a special construction, in which any of the teeth may be disposed out of position so that they will not engage the ratchet wheel. However, this detail of construction forms no part of my present invention. The ratchet rack is disposed upon the bed A of the machine, so that as the carriage C travels therealong, the ratchet wheel 25 will engage the teeth and be turned thereby. This causes the worm to turn. The amount of turning will be dependent upon the number of teeth engaged by the ratchet wheel.

Mounted upon the ends of the base plate 20 are channel members 28, best shown in Figs. 1 and 3. The channels in the members form ways for sliding members 29 carrying cross bars 30 and 31. Extending between bars 30 and 31 is a supporting plate 32. This plate is disposed immediately above the worm. Referring especially to Figs. 12, 13, and 14, at about the center of the supporting plate 32 is an opening to receive a nut bar 33, which may be moved into or out of engagement with the worm. For effecting this movement a pivot block is mounted upon the supporting plate 32 and has secured thereto a link 34 with an elongated slot at the end, in which is disposed a pivot pin 35. An operating handle 36 is pivotally mounted upon the pin 35 with one end thereof slidably disposed in a guide 37. The link 34 and handle 36 form a toggle so that when the handle is pressed downwardly, the nut bar 33 engages with the worm and is held in position. Rotation of the worm will then cause movement of the cutlery holding mechanism transversely to the carriage. By raising the handle 36, the nut bar 33 is released and the cutlery holding mechanism is free to be moved to and from the grinding tool.

Posts 38 are pivotally mounted in the cross piece 31. Pivotally mounted on the posts 38 are bowed supporting standards 39 arranged so that the ends may be overlapped. Pivotally mounted in the cross piece 30 is a post 40. Pivotally mounted upon the post is a clamp 41 adapted to hold the blade of the article of cutlery. The clamp 41 consists of two jaws pivotally secured together and having a screw to firmly clamp the jaws against the blade. Pivotally secured to the cross piece 30 is an arcuate guide 42. At the upper end thereof is a clamp 43 adapted to embrace the standards 39. The wing nut 44 is adapted to firmly secure the guide 42 to the standards 39 in any desired position. By loosening the nut 44 and swinging the guide 42 about its pivot point, the inclination of the guide may be adjusted and the bevel of the edge to be ground adjusted. The under jaw of the clamp 41 is provided with ears 45 extending over the sides of the guide and has a roller 46 riding upon the rear of the guide 42 as shown in Figs. 16 and 17. A finger 47, to which the clamp 41 is secured by any suitable means, extends upwardly along the front of the guide and has a roller 48 mounted therein so that the clamp 41 may freely swing along the guide through the arc about its pivot point and together with roller 46 holds the clamp to the guide 42.

Mechanism is provided for positively swinging the clamp along the guide. A wide pinion 49 is journaled upon the base plate 20. Upon one end thereof is an operating gear 50 adapted to be driven by a rack 51 slidably disposed in a way 52 secured to the conveyer carriage. Journaled in the bearings upon the cross pieces 30 and 31 is a shaft 53, and affixed thereto is a segmental gear 54, which is in mesh with the pinion 49. Rotation of the pinion 49 will rotate the segmental gear and the shaft 53. Secured to the shaft 53 is an ear 55. Ear 55 is provided with a bolt 56. Extending over the sides of the ear 55 are the arms of a bifurcated crank member 57 having elongated slots in which the bolt 56 is disposed. Bolt 56 permits the length of the crank arm with respect to the shaft to be varied or adjusted. A pintle 59 is formed upon the crank arm, and pivotally mounted thereon is a member 60 having an eye to receive a pivot pin 61. Pivotally mounted upon pin 61 is a link 62 which is secured at its other end by a pivotal joint to a post 63. Post 63 is pivotally mounted in the clamp 41. Oscillation of the pinion 49 will rock segmental gear 54 and crank 57, thereby pulling upon link 62 and swinging the clamp 41 through an arc with the post 40 as a center as determined by the position of the guide 42.

It is necessary to swing the clamp at the proper time, and this is determined by movement of the pinion 49 indirectly produced by the relative movement of the gear 50 and rack 51.

Mounted upon a vertical pivot pin is a lock catch lever 64 having a head arranged in the form of a tooth adapted to be engaged with the teeth on the gear 50. In Figs. 5 and 6, the locking lever is shown disengaged from the gear 50. Mounted in bearings with its axis parallel to the axis of gear 49 is a shaft 65. The shaft 65 has fixed thereto a pair of wings 66 arranged to engage one end of catch lever 64. Fixed to the shaft 65 and adapted to engage the other end of the catch lever is a pair of wings 67 arranged at right angles to wings 66. Thus, by rotating shaft 65 catch lever 64 may be swung into locking position with the gear 50 and held therein by the wings 67. In Figs. 5, 6, and 8, the catch lever is shown released. In Fig. 9 the shaft 65 is shown in position holding the catch lever in engagement with the gear. Secured to the end of shaft 65 is a star wheel 68 shown in Figs. 18 and 18ª having a cam hub 69 arranged with a pair of high portions at 180° to each other tapering to one end and a corresponding pair of high portions at the opposite end tapering toward the other end at right angles to the first pair, and a follower free to move axially of the wheel would ride from one end of the cam to the other end during a quarter of a revolution. These portions merge to form smooth cam surfaces. Pivotally mounted upon a post secured to the base plate 20 is a lever 70 having an opening for wheel 68 and resting upon the cam 69 see Figs. 1 and 19. The cam will raise and lower the lock lever 70.

Secured to the bed A is a bar 71, and fixedly secured thereto is a tooth bar 72 provided with teeth 73 and 74 disposed to be engaged by the teeth on wheel 68, so that as the conveyer carriage C travels along from one end of the machine to the other the teeth will engage the wheel 68, and each tooth rotates the wheel one quarter of a revolution. The tooth bar 72 is made removable from the bar 71, there being dowel pins 75 fixed to the bar 71 and adapted to pass through openings in the tooth bar. A hook 76 is secured to the bar 71 and is adapted to pass through a corresponding opening in the bar. A catch 77 is pivotally secured to the tooth bar in position to be moved into the mouth of the hook, and thereby securely hold the tooth bar to the bar 71. A rack holding bar 78 is pivotally secured to the upper edge of bar 71 so that it may swing about a horizontal axis. The bar 78 has at its end lateral projections 79 adapted to be disposed in the line of the rack 51, when in its innermost position, as shown in Fig. 8. In its outermost position as shown in Fig. 9, the projections 79 are out of line with the rack 51, and the latter is free to be moved. It will be noted that the upper edge of the rack holding bar 78 rests against the cam 69 and is moved thereby from the position shown in Fig. 8 to that shown in Fig. 9 and back again, as the cam rotates. A hook 80 upon the end of locking lever 70 is arranged when in lower position to hold the bar 78 in either of its positions. The cam 69 raises and lowers the lock lever 70 upon rotation of the shaft 65. In Fig. 10, it is shown in its upper position. Assume that the conveyer carriage is traveling toward the right, but the lock lever 70 has not reached the tooth 73. The rack holding bar 78 is then in the position shown in Fig. 9. Upon the wheel 68 engaging the tooth 73, the locking lever 70 is raised disposing the hook 80 above the rack holding bar 78 as shown in Fig. 10. The cam 69 then swings the bar 78 inwardly into the position shown in Fig. 8. Thereafter the conveyer carriage travels with the projections 79 engaging the rack 51 and holding the latter against movement relative to the bed A, thereby causing relative movement of the rack with respect to the carriage.

This causes rotation of the gear 50 and the pinion 49, thereby rocking the segmental gear 54. This movement continues until the wheel 68 engages the next tooth 74 and rotates the wheel 68 another quarter of a revolution. The result is that locking lever 70 is raised with the hook 80 out of the way of rack holding bar 78. The cam 69 then moves the rack holding bar outwardly into the position shown in Fig. 9. This releases the rack 51 from the projections 79, and it has no movement with respect to the carriage. As the conveyer returns, tooth 74 will engage the wheel 68, and the reverse of the operations just described will be followed.

Having considered the details of the machine and the function of some of the details, we will now consider the operation of the device as a whole. Suppose a shears is to be ground, a blade thereof is secured by the clamp 41 so that the edge will be presented to the grinding wheel with the point of the shears to the right. Wing nut 44 is loosened and the bowed standards 39 and guide 42 tilted to produce the proper bevel. The handle 36 is raised, releasing the cutlery holding mechanism from the bed, and the latter is moved to the position where grinding of the blade will commence. The carriage at starting is positioned with the right hand end or point of the shears to the left of the grinding wheel G, the star wheel 68 being spaced to the left of tooth 73. Handle 36 is now pushed downwardly to lock the nut bar 33 to the worm 21 so that automatic feeding of the blade toward the wheel will occur. The nut on bolt 56 is now loosened, and the crank arm 57 adjusted. By lengthening the crank arm the clamp moves along the guide at a relatively slow speed with respect to the movement of the carriage, thereby producing a curve of long radius upon the knife blade. By shortening the crank arm a curve of shorter radius is secured. This object is also obtained by moving the crank arm through an arc so that the pintle 59 is brought closer or farther from the shaft 53. The curve to be ground depends upon the distance between the crank shaft 53 and the pintle 59 to the right. The conveyer is then started and the carriage reciprocates. During travel in one direction, the ratchet wheel 25 is engaged by the ratchet teeth 27 and turned. This causes the worm 21 to be turned and the cutlery holding mechanism to be moved toward the grinding wheel. This produces automatic feeding of the blade toward the grinding wheel. On the return movement of the carriage, the ratchet teeth 27 do not turn the ratchet wheel 25. Referring particularly to Fig. 19, the carriage is positioned at starting with the point of the shears to the left of the grinding wheel. As the carriage moves to the right the rack holding bar 78 is in the position shown in Fig. 9, and the rack 51 may pass the left hand projection 79 on the bar. The catch lever 64 has the tooth thereon disposed between the teeth on gear 50. Wings 67 hold the catch lever in this position. This prevents rotation of the pinion 49 and gear 50, the gear 50 thereby causing the rack to slide in the ways 52. The pinion 49 being in mesh with segmental gear 54, movement of the latter occurs. Upon the carriage reaching the position such that the hook 80 on the lever 70 engages the tooth 73, the point of the shears engages the grinding wheel and the lever is raised to a position permitting the swinging of bar 78. At this instant the tooth 73 engages a tooth on the wheel 68 and the latter is rotated one quarter of a revolution. This turns the shaft 65 one quarter of a revolution and moves the catch lever into the position shown in Fig. 6, it being held in this position by the wings 66. Turning of the shaft 65 causes the cam 69 to swing the bar 78 into the position shown in Fig. 8. In this position the projections 79 are in line with the rack 51 and hold the rack bar stationary. The result is that gear 50 riding on the rack 51 is rotated causing the pinion 49 to rotate. This causes movement of the segmental gear 54, the crank arm 57, and through the linkage swings the clamp 41 downwardly so as to produce a curve on the cutting edge of the blade. The parts are now in the position shown in Figs. 1, 5, and 7. Movement of the clamp continues, until the wheel 68 engages the tooth 74. Before the wheel engages the tooth 74, lever 70 is raised out of the way of bar 78, and rotation of the wheel 68 through one quarter revolution swings the bar into the position shown in Fig. 9, thereby releasing the rack 51. The lever 70 then holds the bar 78 in released position. At the same time the wings 67 on shaft 65 move the catch lever 64, so that its tooth engages between teeth on gear 50 and locks the pinion 49 against rotation, thereby again causing the rack to travel with the reciprocating carriage. The carriage then continues on to the end of its travel without further movement of the clamp 41. Upon its return movement, lever 70 is again lifted, wheel 68 is turned through one quarter of a revolution by the tooth 74, rack 51 engaged by the projections 79 on the rack holding bar, pinion 49 is unlocked and the clamp 41 swung back through the arc of its circle. Upon the lever 70 reaching the tooth 73, the rack 51 is released, and pinion 49 locked, thereby holding the clamp 41 against movement. While the star wheel is intermediate teeth 73 and 74, the parts are positioned so that the clamp may be swung, but when on the outer sides of teeth 73 and 74, the clamp is maintained stationary.

If it is desired to grind a straight edge with no curve, the latch 77 is raised from hook 76 and the rack 72 allowed to drop outwardly away from the bar 71. This places teeth 73 and 74 out of the path of star wheel 68 and the latter is not rotated in its travel back and forth. The star wheel remains in position holding catch lever 64 in engagement with gear 50 locking the latter against rotation so that the clamp 41 is not swung during movement of the carriage.

A variety of adjustments are possible as is obvious from the details of the structure just described.

What I claim is:

1. In a cutlery grinding mechanism, the combination of a reciprocating carriage, a clamp for the cutlery adapted to present the blade to the grinding tool, and means operated by reciprocation of the carriage to swing the clamp through the arc of a circle at a point in its travel so as to grind a curved edge.

2. In a cutlery grinding mechanism, the combination of a reciprocating carriage, a clamp for the cutlery adapted to present the blade to the grinding tool, means operated by reciprocation of the carriage to swing the clamp through the arc of a circle at a point in its travel so as to grind a curved edge, and means to adjust the radius of curvature of the arc.

3. In a cutlery grinding mechanism, the combination of a reciprocating carriage, a clamp for the cutlery adapted to present the blade to the grinding tool, means operated by reciprocation of the carriage to swing the clamp through the arc of a circle at a point in its travel so as to grind a curved edge, and means to adjust the clamp so as to selectively vary the bevel of the edge.

4. In a cutlery grinding mechanism, the combination of a reciprocating carriage, a clamp pivotally secured at one end to the carriage for presenting the blade to the grinding tool, an oscillatory crank arm connected to the free end of said clamp so as to swing the clamp through the arc of a circle, and means operated by reciprocation of the carriage to oscillate said arm during a portion of the travel of said carriage whereby a curved edge may be ground.

5. In a cutlery grinding mechanism, the combination of a reciprocating carriage, a clamp pivotally secured at one end to the carriage for presenting the blade to the grinding tool, an oscillatory crank arm connected to the free end of said clamp so as to swing the clamp through an arc of a circle, means operated by reciprocation of the carriage to oscillate said arm during a portion of the travel of said carriage, whereby a curved edge may be ground, and means to adjust the clamp so as to selectively vary the bevel of the edge.

6. In a cutlery grinding mechanism, the combination of a reciprocating carriage, a clamp pivotally secured at one end to said carriage for presenting the blade to the grinding tool, an oscillatory crank arm connected to the free end of said clamp so as to swing the clamp through an arc of a circle, said arm being adjustable as to its radial length with respect to its axis, and means to oscillate said arm during a portion of the travel of said carriage whereby curved edges of selected radii may be ground.

7. In a cutlery grinding mechanism, the combination of a reciprocating carriage, a clamp pivotally secured at one end to said carriage for presenting the blade to the grinding tool, an oscillatory crank arm connected to the free end of said clamp so as to swing the clamp through an arc of a circle, said arm being adjustable as to its radial length with respect to its axis, means to oscillate said arm during a portion of the travel of said carriage whereby curved edges of selected radii may be ground, and means to adjust the clamp so as to selectively vary the bevel of the edge.

8. In a cutlery grinding mechanism, the combination of a reciprocating carriage, a clamp pivotally secured at one end to said carriage for presenting the blade to the grinding tool, a shaft, an oscillatory crank arm mounted on said shaft and connected to the free end of said clamp so as to swing the latter through the arc of a circle, a gear fixed to said shaft, a pinion in mesh with said gear, an operating gear connected to said pinion so as to rotate the latter, a rack slidably mounted on said carriage and in mesh with said operating gear, a stationary rack holding device engageable with said rack so as to hold the latter, means on said carriage to move said rack holding device into and out of engagement with said rack at portions of the travel of said carriage, whereby said operating gear is rotated and said clamp swung to grind a curved edge.

9. In a cutlery grinding mechanism, the combination of a reciprocating carriage, a clamp pivotally secured at one end to said carriage for presenting the blade to the grinding tool, a shaft, an oscillatory crank arm mounted on said shaft and connected to the free end of said clamp so as to swing the latter through the arc of a circle, said crank arm being adjustable as to its radial length with respect to its axis, a gear fixed to said shaft, a pinion in mesh with said gear, an operating gear connected to said pinion so as to rotate the latter, a rack slidably mounted on said carriage and in mesh with said operating gear, a stationary rack holding device engageable with said rack so as to hold the latter, and means on said carriage to move said rack holding device into and out of engagement with said rack at portions of the travel of said carriage, whereby said operating gear is rotated and said clamp swung to grind a curved edge of selected radius dependent upon the adjustment of the crank arm.

10. In a cutlery grinding mechanism, the combination of a reciprocating carriage, a clamp pivotally secured to one end of said carriage for presenting the blade to the grinding tool, a shaft, an oscillatory crank arm mounted on said shaft and connected to the free end of said clamp so as to swing the latter through the arc of a circle, a gear fixed to said shaft, a pinion in mesh with said gear, an operating gear connected to said pinion so as to rotate the latter, a rack slidably mounted on said carriage and in mesh with said operating gear, a stationary rack holding device engageable with said rack so as to hold the latter, means on said carriage to move said rack holding device into and out of engagement with said rack at portions of the travel of said carriage, and means on said carriage to lock said rack holding device in positions of engagement and disengagement.

11. In a cutlery grinding mechanism, the combination of a reciprocating carriage, a clamp pivotally secured at one end of said carriage for presenting the blade to a grinding tool, a shaft, an oscillatory crank arm mounted on said shaft and connected to the free end of said clamp so as to swing the latter through the arc of a circle, a gear fixed to said shaft, a pinion in mesh with said gear, an operating gear connected to said pinion so as to rotate the latter, a rack slidably mounted on said carriage and in mesh with said operating gear, a stationary rack holding device in engagement with said rack so as to hold the latter, means on said carriage to move said rack holding device into and out of engagement with said rack at portions of the travel of said carriage, means on said carriage to lock said rack holding device in positions of engagement and disengagement, and means operated by said rack bar holding device to lock said operating gear against rotation when said rack is held disengaged and to release said operating gear when said rack is held engaged.

12. In a cutlery grinding mechanism, the combination of a reciprocating carriage, a clamp pivotally secured at one end to said carriage for presenting the blade to a grinding tool, an oscillatory crank arm mounted on said shaft and connected to the free end of said clamp so as to swing the latter through the arc of a circle, a gear fixed to said shaft, a pinion in mesh with said gear, an operating gear connected to said pinion so as to rotate the latter, a rack slidably mounted on said carriage and in mesh with said operating gear, a stationary rack holding bar pivoted so as to be swung to and from said rack and to hold and release the latter during portions of the travel of said carriage, a lock lever pivotally mounted on said carriage and having an end arranged to normally be disposed on either side of said bar whereby to hold the latter in engagement or out of engagement with said rack, means to lift said lock lever and free said holding bar and swing the latter from engaged to disengaged position or vice versa.

13. In a cutlery grinding mechanism, the combination of a reciprocating carriage, a clamp pivotally secured at one end to said carriage for presenting the blade to a grinding tool, a shaft, an oscillatory crank arm mounted on said shaft and connected to the free end of said clamp so as to swing the latter through the arc of a circle, a gear fixed to said shaft, a pinion in mesh with said gear, an operating gear connected to said pinion so as to rotate the latter, a rack slidably mounted on said carriage in engagement with said operating gear, a stationary rack holding bar pivoted so as to be swung to and from said rack and to hold and release the latter during portions of the travel of said carriage, a lock lever pivotally mounted on said carriage and having an end arranged to normally be disposed on either side of said bar whereby to hold the latter in engagement or out of engagement with said rack, a cam shaft having a cam to lift said lock lever and free said holding bar and swing the latter from engaged to disengaged position or vice versa, a star wheel fixed to said cam shaft and a stationary bar provided with teeth to engage said star wheel in its travel and rotate the latter.

14. In a cutlery grinding mechanism, the combination of a reciprocating carriage, a clamp pivotally secured at one end to said carriage for presenting the blade to a grinding tool, a shaft, an oscillatory crank arm mounted on said shaft and connected to the free end of said crank so as to swing the latter through the arc of a circle, a gear fixed to said shaft, a pinion in mesh with said gear, an operating gear connected with said pinion so as to rotate the latter, a rack slidably mounted on said carriage and in mesh with said operating gear, a stationary rack holding bar pivoted so as to be swung to and from said rack and to hold and release the latter during portions of the travel of said carriage, a lock lever pivotally mounted on said carriage and having an end arranged to be disposed normally on either side of said bar whereby to hold the latter in engagement or out of engagement with said rack, a cam shaft having a cam to lift said lock lever and free said holding bar and swing the latter from engaged to disengaged position or vice versa, a star wheel on said cam shaft to rotate the latter, a stationary bar provided with teeth to engage said star wheel in its travel, a catch lever to lock said operating gear, and means on said cam shaft to move said catch lever in locking and released positions and to hold said catch lever in either position.

15. In a cutlery grinding mechanism, the combination of a reciprocating carriage, a cutlery holding mechanism mounted thereon for sliding movement transverse to the travel of said carriage, a worm journaled on said carriage, a ratchet wheel geared to said worm, a stationary ratchet rack for engagement with said wheel, a nut bar on said cutlery holding mechanism for engagement with said worm whereby the cutlery holding mechanism may be automatically fed by said worm toward the grinding tool or released, and means to move and lock said nut bar in either engaged or disengaged position with said worm.

In witness that I claim the foregoing I have hereunto subscribed my name this 26th day of June, 1920.

ORVILLE P. NORMAN.